Feb. 12, 1929.

L. F. ORDELHEIDE 1,701,983

DISK FOR CULTIVATOR ATTACHMENTS

Filed Oct. 6, 1927    2 Sheets-Sheet 1

Inventor

Louis F. Ordelheide

By Clarence A O'Brien
Attorney

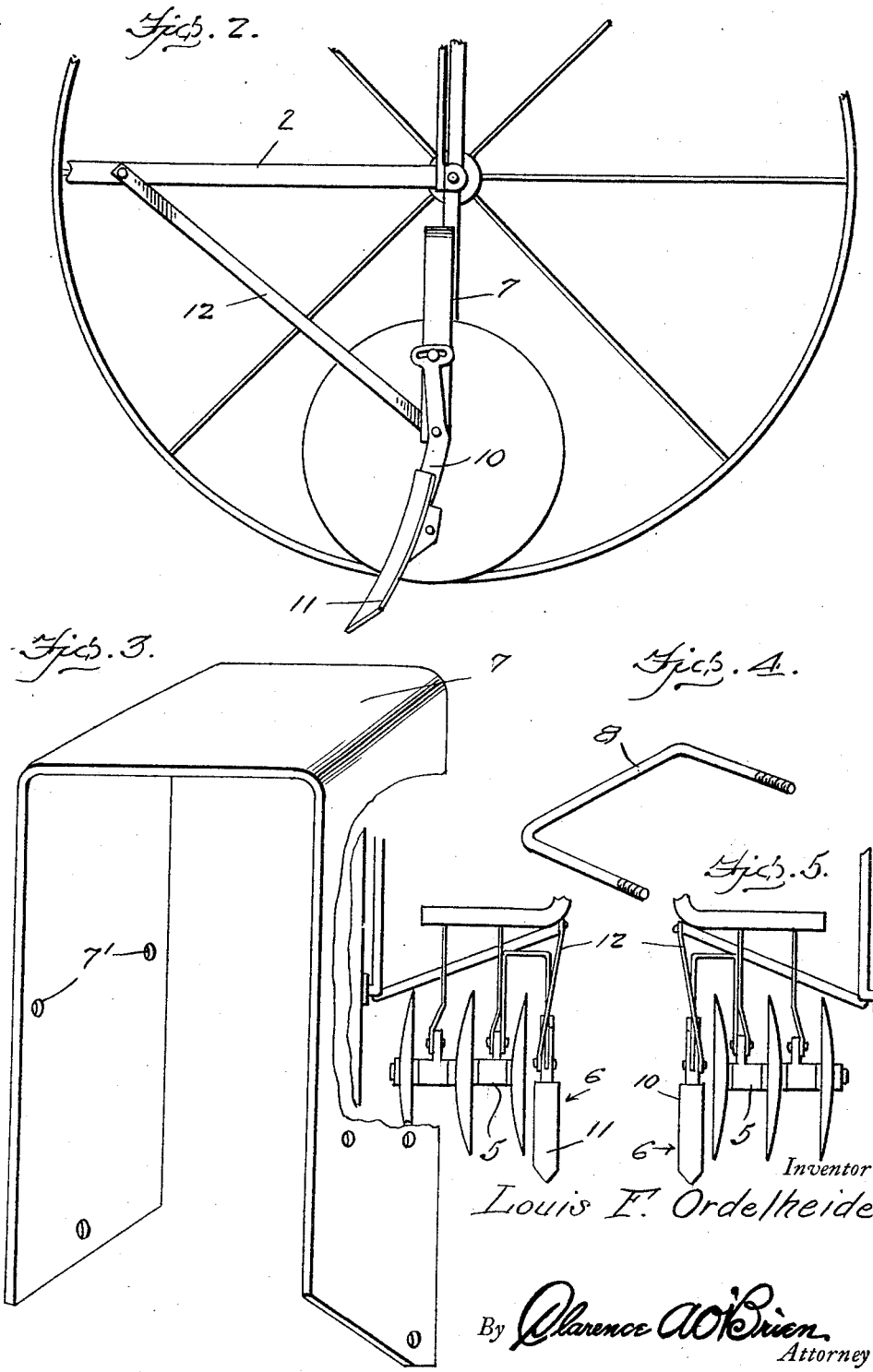

Patented Feb. 12, 1929.

1,701,983

UNITED STATES PATENT OFFICE.

LOUIS FRANK ORDELHEIDE, OF BELLFLOWER, MISSOURI.

DISK FOR CULTIVATOR ATTACHMENTS.

Application filed October 6, 1927. Serial No. 224,362.

This invention relates to new and useful improvements in cultivators of the double gang disk type and aims to provide a bull tongue attachment therefor. It is well known that in the operation of the conventional double gang disk cultivator the inner disks of the gangs are so spaced that they do not stir and cultivate the corn sufficiently directly adjacent the corn stalks, frequently necessitating a second use of the cultivator. Therefore, my invention aims to provide a pair of bull tongues for attachment adjacent the innermost disks of the two gangs and rigidly associated with the cultivator construction so that the earth directly adjacent the corn stalks will be cultivated and be caused to fall around the stalks covering weeds and grass which is necessary in the proper cultivation of corn.

The most important object of the invention is to provide a bull tongue attachment of this character that may be associated with generally conventional double gang disk cultivators without altering the construction thereof and without interfering with the proper operation of the cultivator disks.

Furthermore, the invention aims to provide such an attachment that is extremely simple and that may be readily attached to a conventional cultivator in a simple and expeditious manner.

With the foregoing and other objects in view as the nature of the invention will be better understood, the same comprises the novel form, combination and arrangement of parts hereinafter more fully described, shown in the accompanying drawings and claimed.

In the drawings wherein like reference characters indicate corresponding parts throughout the several views:—

Figure 2 is a fragmentary view in side elevation of the cultivator at the inner end of one of the gangs showing more clearly the bull tongue for that particular gang.

Figure 3 is a fragmentary perspective of the main unit for facilitating the attachment of one of the bull tongues to the cultivator.

Figure 4 is a perspective of a conventional U-bolt that is employed as certain of the means to secure the support for one of the bull tongues to the cultivator.

Figure 5 is a fragmentary front elevation of a conventional cultivator disclosing both of the gangs adjacent the inner disks of which are disposed the two bull tongues.

Figure 1:
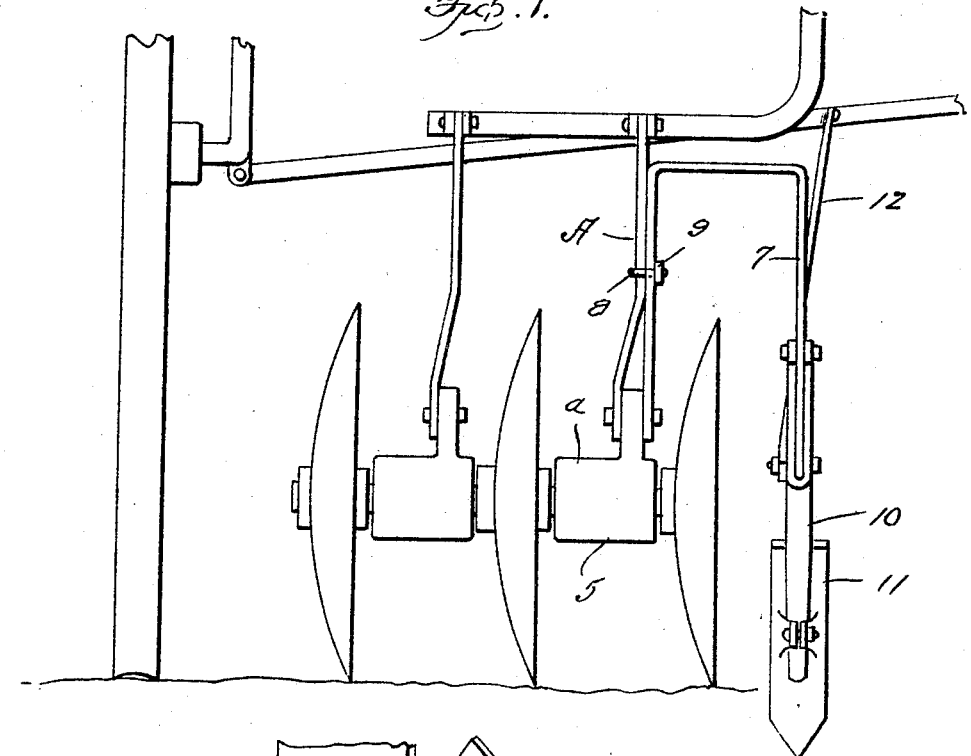
Figure 1 is a fragmentary rear elevation of a conventional double gang disk cultivator one gang thereof being shown and adjacent the inner disk of which is arranged one of the bull tongues.
Figures 6, 7:
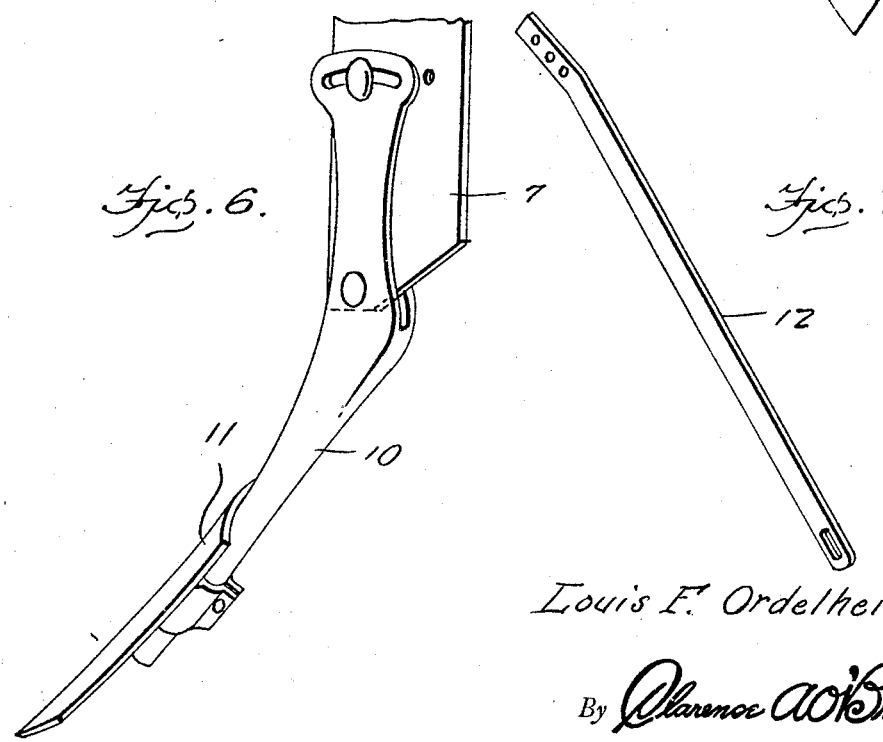
Figure 6 is a perspective disclosing one of the bull tongue standards as attached to its support and with which is associated a conventional bull tongue, and, Figure 7 is a perspective of a brace bar that is employed for bracing one of the supports to the cultivator frame.

Now having particular reference to the drawings, 5—5 designates generally the two spaced gangs of a double disk cultivator of conventional design. Broadly, my invention consists in the disposition of a pair of bull tongues designated generally by the reference characters 6—6 at the inner disks of the two gangs and in slight spaced relation therewith.

Each of the bull tongue units consists of an inverted U-shaped metallic strap 7 one leg of which is arranged against the inner side of the innermost vertical supporting bar A of that particular gang 5 as clearly disclosed in Figure 1. The lower end of said leg of the U-shaped strap is bolted to the usual tongue of the gang shaft boxing $a$ to which the lower end of said bar A is attached. Arranged over this bar A is a U-bolt 8 the ends of which are threaded and passed through a pair of openings 7'—7' in said U-shaped strap at which nuts 9 are threaded thereon. Thus it will be seen that the outer leg of said strap is disposed at the outer side of the innermost disk of the particular gang and in spaced relation therewith. Adjustably and pivotally secured to the lower end of the outermost leg is a conventional bull tongue standard 10 to which is attached a generally conventional bull tongue 11.

For bracing the outer leg of each of the attachment straps 7 to the cultivator frame there is provided a brace bar 12 the inner end of which is adapted to be bolted to the standard 10 at the point of its attachment to the strap 7. The bar is then extended forwardly as indicated in Figure 2 and rigidly anchored to the adjacent forwardly and longitudinally extending frame bar $b$ of the cultivator.

It will thus be seen that in the operation of a cultivator of this type equipped with a pair of these bull tongues in spaced relation with the innermost disks of the two gangs the soil will be cultivated closer to the corn stalks which soil will be turned over and thrown against the corn stalks for covering all grass and weeds at the ground's surface.

In view of the foregoing description when considered in conjunction with the accompanying drawings it will be apparent that I have provided a highly novel, simple and extremely efficient attachment for double gang disk cultivators that is well adapted for all of the purposes heretofore designated, and even though I have herein shown and described the invention as consisting of certain detail structural elements, it is nevertheless to be understood that some changes may be made therein without affecting the spirit and scope of the appended claims.

Having thus described my invention, what I claim as new is:—

1. In a disk cultivator attachment of the character described, an inverted U-shaped strap adapted for disposition over the innermost disk and to be anchored at its inner leg to the cultivator frame the outer leg of said strap having spaced relation with said disk and a bull tongue arranged upon the lower end of the outer leg.

2. In a disk cultivator attachment of the character described, a member secured at one end to the cultivator frame and being disposed over the innermost disk thereon, said member being provided with a depending portion, and a bull tongue arranged upon the lower end of said depending portion.

In testimony whereof I affix my signature.

LOUIS FRANK ORDELHEIDE.